United States Patent [19]

Valdes-Krieg et al.

[11] 4,198,297
[45] Apr. 15, 1980

[54] REMOVAL OF TRACE COPPER IONS FROM WATER

[75] Inventors: Ernesto Valdes-Krieg, Mexico, Mexico; Judson King; Hugo H. Sephton, both of Kensington, Calif.

[73] Assignee: The United States of America as represented by the Secretary of the Interior, Washington, D.C.

[21] Appl. No.: 744,226

[22] Filed: Nov. 23, 1976

Related U.S. Application Data

[63] Continuation of Ser. No. 650,395, Jan. 19, 1976, abandoned, which is a continuation-in-part of Ser. No. 524,173, Nov. 15, 1974, abandoned.

[51] Int. Cl.² .............................................. C02B 1/18
[52] U.S. Cl. ........................................ 210/44; 423/26
[58] Field of Search ................ 210/44, 54, 59; 423/26

[56] References Cited

U.S. PATENT DOCUMENTS

| | | | |
|---|---|---|---|
| 3,054,746 | 9/1962 | Gaden et al. | 210/44 |
| 3,238,127 | 3/1966 | Sebba | 210/44 |
| 3,476,553 | 11/1969 | Sebba et al. | 423/26 |
| 3,510,001 | 5/1970 | Baer et al. | 210/44 |

FOREIGN PATENT DOCUMENTS 708215  4/1965  Canada ........................... 210/44

*Primary Examiner*—Thomas G. Wyse
*Attorney, Agent, or Firm*—William S. Brown; Donald A. Gardiner

[57] ABSTRACT

Cations, such as copper, are recovered from very dilute aqueous solutions by means of a bubble fractionation process comprising countercurrent contacting of the feed solution with a stream of gas bubbles and a surfactant in an elongated vertical column.

5 Claims, 1 Drawing Figure

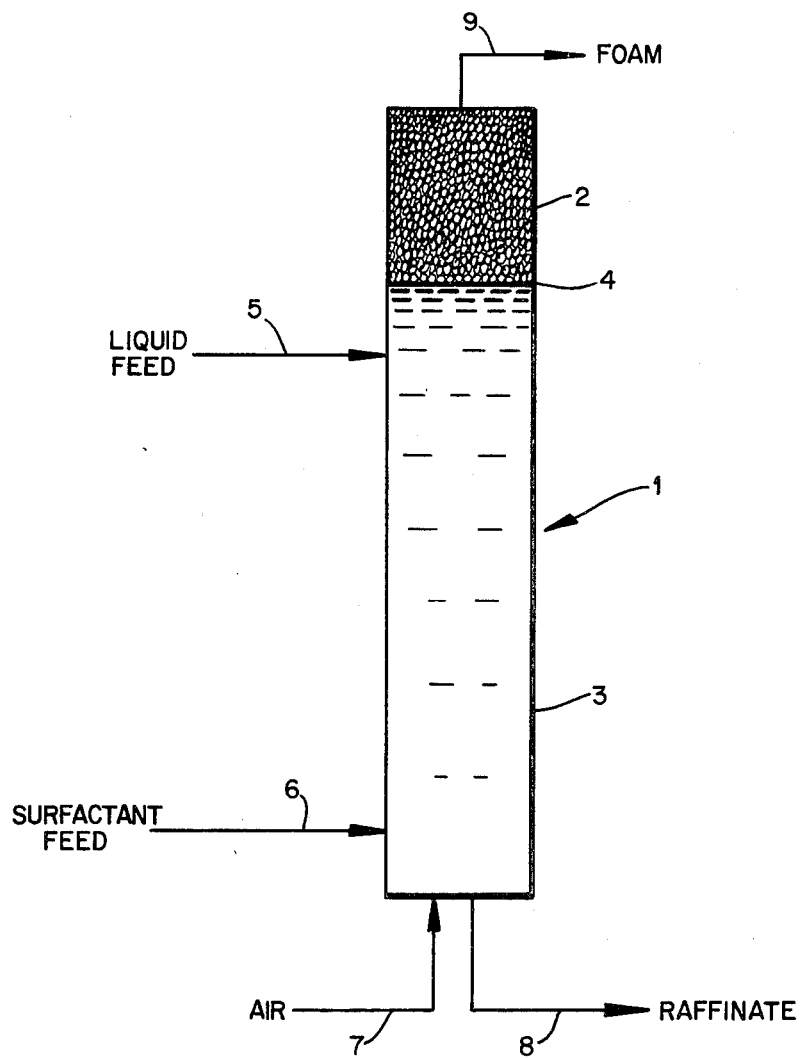

REMOVAL OF TRACE COPPER IONS FROM WATER

This is a continuation of application Ser. No. 650,395 filed Jan. 19, 1976 now abandoned, which is a continuation-in-part of application Ser. No. 524,173, filed Nov. 15, 1974, abandoned.

The Prior Art

Many procedures are known for removal of cations from dilute aqueous solutions. For example, extraction processes and liquid ion exchange processes have been used to remove metal ions from an aqueous phase into an organic phase. In these processes, the distribution coefficient for the metal ion between phases tends to be insensitive to the concentration of the ion, particularly in very dilute solutions. Therefore, the amount of solvent circulation per unit of feed solution required to carry out the process does not change significantly be the metal ion concentration is decreased. As a result, operating costs of such processes are relatively insensitive to metal ion concentration.

Recent proposals for the removal of cations such as copper ions from dilute aqueous solutions involve foam fractionation and bubble fractionation, which are separation processes based upon the selective adsorption of surface active species at a gas-liquid interface. Removal of cations from solution is accomplished through selective attraction of counter-ions to surfactant molecules, or by chelation or other specific interactions with surface-active species.

Foam fractionation has received considerable attention and a number of literature articles have been published dealing with processes of this type. These include Rubin et al in "New Chemical Engineering Separation Techniques", Interscience, 1962, and Dick et al, "Industrial Engineering Chemical Fundamentals", Vol. 10, p. 309, 1971. The principle applications of these processes have been in decontamination of radioactive waste waters.

A U.S. patent dealing with similar subject matter is U.S. Pat. No. 3,238,127 to Sebba which discloses an ion flotation method for the recovery of metallic ions from an aqueous solution by adding to the solution collector ions having an electric charge opposite to that of the metallic ions to form an insoluble reaction product, and collecting the insoluble product by the disposition of a floating layer of a nonaqueous liquid having characteristics adapted for collecting the reaction product.

While the above discussed prior art procedures have substantially improved recovery of metallic ions from dilute aqueous solutions, a need still remains in the art for a simple and economically effective process which could be used to clarify or purify aqueous solutions of this type.

Summary of the Invention

The invention consists of a method for separation and recovery of metal ions, particularly copper ions, from dilute aqueous solutions by means of a bubble fractionation process employing countercurrent contacting of the feed solution with a stream of gas bubbles and a surface-active agent. This is achieved by utilization of an elongated vertical fractionation column, with feed solution being continuously introduced near the top of the column, and the gas bubbles and surfactant, or solution thereof, being continuously introduced near the bottom of the column. Surfactant loading at the gas-liquid interface substantially throughout the length of the column is thereby obtained, resulting in improved separation of metal ions from solution in association with the surfactant. The method of the invention provides an improved method for reduction of metal ion content of aqueous streams, as well as for metal ion enrichment for ultimate recovery of the metal.

Detailed Description of Invention

The invention will be described in detail with reference to the drawing, which is a schematic diagram illustrating the method of the invention.

Fractionation column 1 contains foam region 2, bubble region 3 and the interface 4 between phase regions. In operation, liquid feed, which comprises an aqueous solution containing a minute proportion of metallic ions, is fed in through line 5 below the interface 4. It may be desirable to include a portion of surfactant with the feed being introduced through line 5. A gas such as air is bubbled into the base of the column through line 7 and, in accordance with the teachings of this invention, surfactant feed is introduced through line 6 near the level at which the gas is introduced, that is, near the bottom of the column. Line 6 may, however, be located somewhat above the level of the introduction of the gas to facilitate recovery of a raffinate having a low content of surfactant. The admixture obtained as the air bubbles and surfactant associated therewith travel upward through the column to mix with the liquid feed being introduced by line 5 provides means for the adsorption of the metal from the solution by the surfactant and its accumulation in foam section 2 of the column. The resulting foam comprising the surfactant associated with the metal is removed through line 9 and the raffinate comprising the excess surfactant and a small amount of the feed is removed through line 8.

While the drawing indicates that the feed is introduced at a point just below the foam section, it is possible to introduce the feed directly into the foam. This has, however, often been found to be impractical due to channeling, foam instability and inadequate feed distribution over the cross-section of the foaming device. Thus, the feed is more conveniently and more economically introduced below the liquid foam interface and contacted with upflowing bubbles as it flows upwards in the column. This is the feature designated as bubble fractionation.

Efficient recovery of cations from very dilute solutions by the method of the invention requires the use of an elongated bubble column, i.e., one in which the height of the column is adequate to permit sufficient contact between the metallic cations and the surfactant, and between the surfactant and gas-liquid interface, to establish equilibrium conditions with minimum mixing along the length of the column. These equilibrium conditions are characterized by the presence of axial concentration gradients in metal ion concentration substantially throughout the length of the column, and result in increased separation of the metal cations.

For relatively small scale operations, e.g., where the diameter of the bubble column is about 2 to 6 inches, the column should be at least 24 inches, and preferably about 36 to 72 inches, in height. For such columns, the height of the column is preferably substantially greater than the cross-sectional dimentions of the column. E.g., where a cylindrical column is employed, the ratio of the height of the column to the cross-sectional diameter of the column should be in the range of about 10:1 to about 40:1 in order to provide the above-discussed equilibrium conditions. For larger scale operations, with column diameters in excess of 6 inches, the ratio of height to cross-sectional diameter of the column is less critical. However, the column must still be of sufficient height to provide for establishment of the above-mentioned equilibrium conditions. For this purpose the column height should be at least 36 inches.

If the surfactant were introduced with the liquid feed, according to conventional practice, the surfactant content of the liquid stream would tend to be reduced in the liquid phase column due to the prevailing counter-current flow. In the present invention, however, by introducing the surfactant at a point near the point at which the gas is introduced, there is provided a significant surfactant concentration all along the liquid in the column as an upward surfactant flux is maintained at all levels.

Although, according to the invention, a substantial proportion of the surfactant is fed in at a point near the point at which gas is introduced, it may also be fed in to some extent with the liquid feed, as long as a substantial fraction, e.g., 20 percent or more, is fed near or at the bottom.

The gas bubbles which are introduced into the bottom of the column preferably comprise air for economic purposes but other gases such as nitrogen, helium, methane, ethane, carbon dioxide, oxygen or the like may also be employed.

The process of the present invention is particularly useful for removal of copper from the effluent blow-down brine of evaporation seawater desalination plants. The removal of copper is of importance since it enters the water through corrosion and is at a level (about 0.5 ppm) high enough so that it may be deleterious to marine life if the brine is returned directly to the ocean. However, the process is generally applicable to dilute aqueous solutions of copper regardless of their source. Aqueous solutions of this type may contain as little as about 0.01 and up to about 10 ppm of copper. In addition, the process is applicable to removal of metals other than copper, e.g., cobalt, nickel, lead, etc., from dilute aqueous solutions.

The surfactant employed may be a liquid surfactant or a surfactant-containing solution, and may be any surfactant capable of selectively associating with the metallic cations and attaching to the gas-liquid interface. The amount of surfactant employed may range from about 0.001 to 10 equivalents of surfactant per equivalent of metal. An excess of surfactant is generally preferred to insure that as much of the metal as possible is recovered.

Since the metal ion in the solution is a cation, the surfactant should be anionic. A preferred surfactant is sold commercially as Neodol 25-3A (Shell Chemical Co.), which is the ammonium salt of a sulfated primary alcohol with three ethylene oxide units and a $C_{12}$ to $C_{15}$ alkyl group. Other anionic surfactants that may be used include the oxhydryl compounds having a metal or hydrogen connected to the hydrocarbon group through an oxygen atom, or the sulfhydryl type where the connection is made through a sulfur atom. The oxyhydryl surfactants include carboxylates, acid alkylsulfates, sulfonates, phosphates and phosphonates. The sulfhydryl compounds include mercaptans, thiocarbonates (xanthates), thioureas and dithiophosphates. Examples of anionic surfactants include the acids and sodium, potassium or ammonium salts of rosin, the tall oils and animal and vegetable oils; naphthenic acids; sodium-n-octylsulfate; potassium-n-dodecylsulfate; the ammonium salt of n-dodecyldiethyleneglycolsulfate; the sodium salt of crude or refined petroleum; sulfonic acid; β-phenylpropionic acid; pelargonic acid; mixtures of acids derived from linseed oil, soybean oil, palm oil, corn oil and cottonseed oil; monosodium α-sulfopalmitate; disodium α-sulfostearate, 1,3-diphenyl-2-thiourea and thiocarbanilide. The above-described examples of anionic surfactants are but a few of the many surfactants that are known to be commercially practicable and that are used in flotation procedures.

The following example is presented to illustrate the invention but it is not to be considered as limited thereto. In this example and throughout the specification parts are by weight unless otherwise indicated.

EXAMPLE

An aqueous feed solution containing 1.0 ppm of copper in the form of copper sulfate and 41.6 parts per million of the surfactant Neodol 25-3A was fed into a column just below the foam region-bubble region interface at a rate of 2.20 gpm/ft$^2$. The column had a 4½ inch diameter at the foam section but was otherwise 2½ inches in diameter and 6 feet high. The feed was introduced about 5 feet above the bottom. At the bottom of the column air was introduced through a porous, fused silica diffuser plate in the form of fine bubbles at the rate of 668 scfm/ft$^2$. At a level 9 inches above the bottom, additional surfactant feed was introduced, this surfactant feed comprising 1,000 ppm of Neodol at the rate of 0.063 gpm/ft$^2$. The air bubbles and surfactant progressed through the column to mix with the liquid feed being introduced just below the interface.

From the foam at the top of the column was recovered a mixture comprising 248 ppm Neodol and 6.10 ppm copper at the rate of 0.35 gpm/ft$^2$. The raffinate removed from the bottom of the column contained 40.0 ppm Neodol and about 0.01 ppm copper. Thus, over 99 percent of the copper was removed from the feed.

It is evident from these results that the method of the invention provides a very effective means for reduction of the copper ion content of an aqueous stream. In addition, however, it will be noted that a six-fold enrichment with respect to copper was obtained, thus providing an effective means for concentrating the metal for recovery by conventional methods.

For purposes of comparing the above results with the prior art, a batch process was carried out according to the following procedure. A 600 cc Buechner funnel containing a Grade F fritted glass sparger was charged with 500 cc of an aqueous feed solution containing 1.0 ppm of copper in the form of copper sulfate. Air was sparged through the solution at a rate of 150 cc/min for a time sufficient to give a volumetric ratio of total air sparged to feed solution equal to 5.3, the same as the volumetric ratio of air to solution employed in the above continuous countercurrent experiment. Neodol surfactant was added to the solution to give a concentration of 90 ppm, also corresponding to the concentration of surfactant used in the above continuous countercurrent experiment. The percentage removal of the copper from the feed solution was found to be 88 percent. Obviously, the continuous countercurrent process, with 99 percent removal of copper, was substantially more efficient.

We claim:

1. A method for separation or recovery of metal ions from solution in an aqueous feed, said feed containing up to about 10 ppm of said metal ions, consisting of continuously introducing the feed near the top of an elongated vertical bubble fractionation column, the height of said column being at least 24 inches, and simultaneously and continuously introducing (1) a stream of gas bubbles and (2) an anionic surfactant or aqueous solution thereof near the bottom of said column, the rates of introduction of feed, stream of gas bubbles and surfactant being sufficient to provide a flow of liquid phase counter-current to gas bubbles having a surfactant-loaded liquid interface associated therewith substantially throughout the length of the column, whereby the metal ions associated with the interface are removed at the top of the column.

2. The method of claim 1 in which the diameter of the column is about 2 to 6 inches and the ratio of the height of the column to the cross-sectional diameter of the column is in the range of about 10:1 to 40:1.

3. The method of claim 1 in which the diameter of the column is about 2 to 6 inches and the height of the column is about 36 to 72 inches.

4. The method of claim 1 in which the diameter of the column is greater than 6 inches and the height of the column is greater than 36 inches.

5. The method of claim 1 in which the metal ions are copper ions.

* * * * *